US007809869B2

(12) United States Patent
Atherton et al.

(10) Patent No.: US 7,809,869 B2
(45) Date of Patent: Oct. 5, 2010

(54) THROTTLING A POINT-TO-POINT, SERIAL INPUT/OUTPUT EXPANSION SUBSYSTEM WITHIN A COMPUTING SYSTEM

(75) Inventors: William E. Atherton, Hillsborough, NC (US); Thomas A. Gregg, Highland, NY (US); Paul J. Mattos, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 11/957,428

(22) Filed: Dec. 20, 2007

(65) Prior Publication Data

US 2009/0164684 A1 Jun. 25, 2009

(51) Int. Cl.
*G06F 13/00* (2006.01)
*G06F 13/40* (2006.01)

(52) U.S. Cl. .................... 710/104; 710/307
(58) Field of Classification Search ........... 710/104, 710/307
See application file for complete search history.

(56) References Cited

U.S. PATENT DOCUMENTS

| | | | |
|---|---|---|---|
| 6,029,006 A | 2/2000 | Alexander et al. | |
| 6,966,007 B2 | 11/2005 | Kuo et al. | |
| 7,003,658 B2 | 2/2006 | Chen | |
| 7,099,969 B2 * | 8/2006 | McAfee et al. | 710/107 |
| 7,103,797 B1 | 9/2006 | Wahl et al. | |
| 7,136,953 B1 * | 11/2006 | Bisson et al. | 710/307 |
| 7,174,411 B1 * | 2/2007 | Ngai | 710/316 |
| 7,197,591 B2 * | 3/2007 | Kwa et al. | 710/307 |
| 7,426,597 B1 * | 9/2008 | Tsu et al. | 710/307 |
| 7,447,824 B2 * | 11/2008 | Jabori et al. | 710/307 |
| 7,480,757 B2 * | 1/2009 | Atherton et al. | 710/313 |
| 7,536,490 B2 * | 5/2009 | Mao | 710/104 |
| 2005/0270988 A1 * | 12/2005 | DeHaemer | 370/254 |
| 2005/0283561 A1 * | 12/2005 | Lee et al. | 710/307 |
| 2005/0285865 A1 * | 12/2005 | Diamond | 345/520 |
| 2006/0112210 A1 * | 5/2006 | Tseng | 710/307 |
| 2006/0137377 A1 | 6/2006 | Samson et al. | |
| 2007/0067548 A1 * | 3/2007 | Juenger | 710/315 |
| 2007/0094436 A1 * | 4/2007 | Keown et al. | 710/307 |
| 2007/0094437 A1 * | 4/2007 | Jabori et al. | 710/307 |
| 2007/0233930 A1 * | 10/2007 | Gallagher et al. | 710/307 |
| 2007/0276981 A1 * | 11/2007 | Atherton et al. | 710/307 |
| 2008/0022024 A1 * | 1/2008 | Mao | 710/104 |
| 2008/0294831 A1 * | 11/2008 | Mao | 710/307 |
| 2009/0157920 A1 * | 6/2009 | Foster, Sr. | 710/62 |

\* cited by examiner

*Primary Examiner*—Ryan Stiglic
(74) *Attorney, Agent, or Firm*—Brandon C. Kennedy; Cynthia G. Seal; Biggers & Ohanian, LLP

(57) ABSTRACT

Methods, systems, and apparatus are disclosed for throttling a point-to-point, serial I/O expansion subsystem within a computing system that include: receiving, by a link configuration module, an external environmental parameter value representing a condition of an environment external to the computing system; determining, by the link configuration module, a link configuration of a communication link for an I/O adapter in a point-to-point, serial I/O expansion subsystem within the computing system in dependence upon the external environmental parameter value; and configuring, by the link configuration module, the communication link for the I/O adapter in dependence upon the link configuration.

18 Claims, 5 Drawing Sheets

Receive, By A Link Configuration Module, An External Environmental Parameter Value Representing A Condition Of An Environment External To The Computing System 500

Determine, By The Link Configuration Module, A Link Configuration Of A Communication Link For An I/O Adapter In A Point-to-point, Full-duplex I/O Expansion Subsystem Within The Computing System In Dependence Upon The External Environmental Parameter Value 502

Identify A Link Configuration Profile For The I/O Adapter, The Link Configuration Profile Specifying Acceptable Configuration Changes To The Communication Link For The I/O Adapter Based On The Condition Of The Environment External To The Computing System 504

Determine The Link Configuration Of The Communication Link For The I/O Adapter In Dependence Upon The Link Configuration Profile For The I/O Adapter 506

Configure, By The Link Configuration Module, The Communication Link For The I/O Adapter In Dependence Upon The Link Configuration 508

Change A Link Speed Of The Communication Link For The I/O Adapter 510

Change A Link Width Of The Communication Link For The I/O Adapter 512

THROTTLING A POINT-TO-POINT, SERIAL INPUT/OUTPUT EXPANSION SUBSYSTEM WITHIN A COMPUTING SYSTEM

BACKGROUND OF THE INVENTION

1. Field of the Invention

The field of the invention is data processing, or, more specifically, methods, systems, and products for throttling a point-to-point, serial input/output ('I/O') expansion subsystem within a computing system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

In order to deliver high performance computers, computer architects must design powerful computer subsystems for utilizing processors, memory, expansion input/output devices, and so on. The drawback to these powerful computer subsystems is that their operation often produces excess thermal energy and vibrations that can damage the components of the computer. The excessive thermal energy and vibrations are often detected as they raise the temperature and acoustic level in the environment external to the computing system. Moreover, excessive thermal energy and vibrations increase the computer's power consumption.

SUMMARY OF THE INVENTION

Methods, systems, and apparatus are disclosed for throttling a point-to-point, serial I/O expansion subsystem within a computing system that include: receiving, by a link configuration module, an external environmental parameter value representing a condition of an environment external to the computing system; determining, by the link configuration module, a link configuration of a communication link for an I/O adapter in a point-to-point, serial I/O expansion subsystem within the computing system in dependence upon the external environmental parameter value; and configuring, by the link configuration module, the communication link for the I/O adapter in dependence upon the link configuration.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 5 sets forth a flow chart illustrating an exemplary method of throttling a point-to-point, serial I/O expansion subsystem within a computing system according to embodiments of the present invention.

DETAILED DESCRIPTION OF EXEMPLARY EMBODIMENTS

Figure 1:
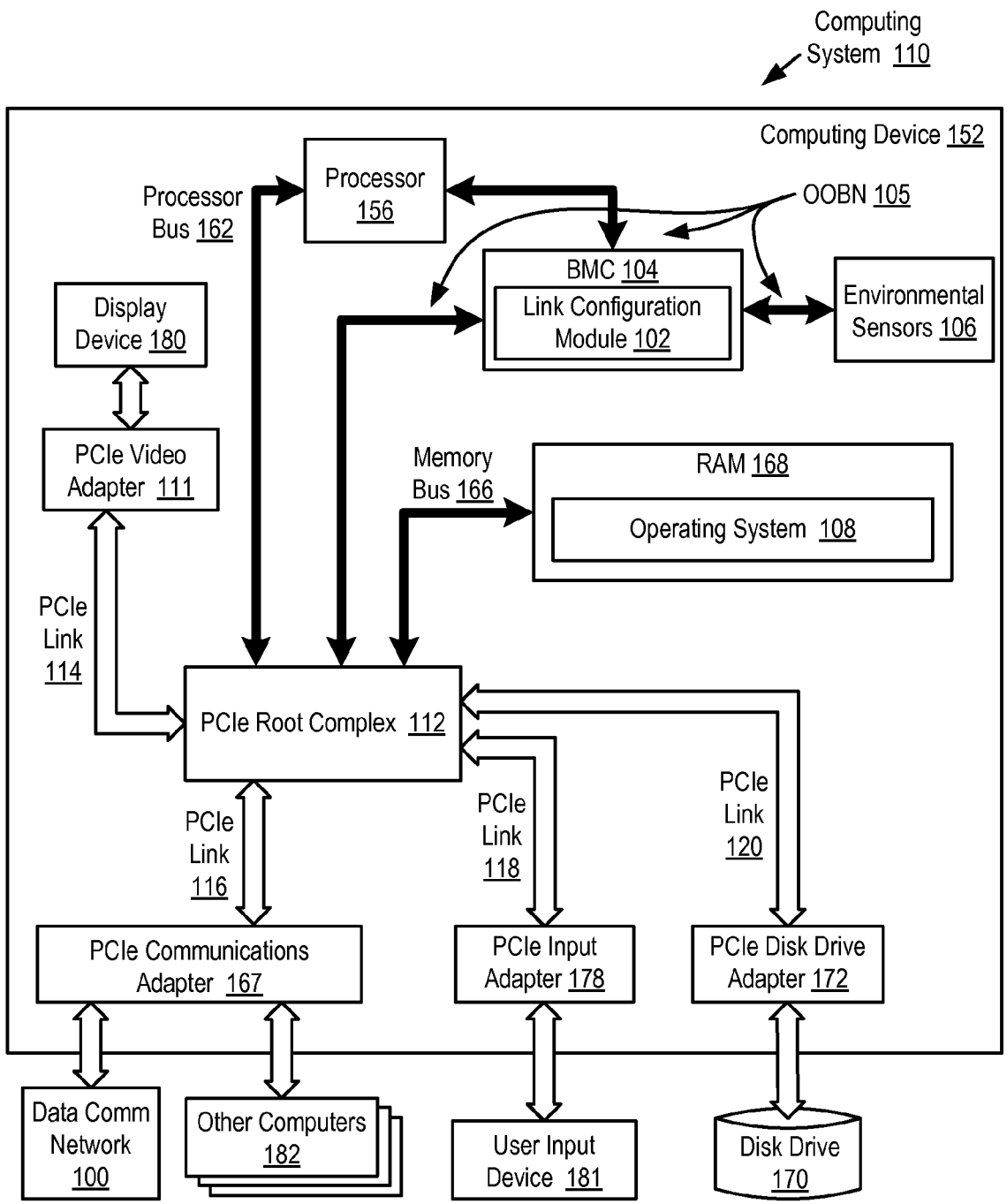
FIG. 1 sets forth a block diagram of automated computing machinery comprising an exemplary computing system useful in throttling a point-to-point, serial I/O expansion subsystem within the computing system according to embodiments of the present invention.

Exemplary methods, apparatus, and products for throttling a point-to-point, serial I/O expansion subsystem within a computing system according to embodiments of the present invention are described with reference to the accompanying drawings, beginning with FIG. 1. FIG. 1 sets forth a block diagram of automated computing machinery comprising an exemplary computing system (110) useful in throttling a point-to-point, serial I/O expansion subsystem within the computing system according to embodiments of the present invention. The term 'throttling' refers to changing the configuration of various communication links within the expansion subsystem in response to changes in the condition of the environment external to the computing system (110) such as, for example, changes in ambient temperature or acoustic level.

A point-to-point, serial I/O expansion subsystem is an expansion adapter architecture that utilizes a switch to route data communications between subsystem components connected to the switch through dedicated, serial communication links. Each dedicated, serial communication link is composed of a scalable number of physical communication lanes. In the example of FIG. 1, the point-to-point, serial I/O expansion subsystem in computing device (152) is implemented as a Peripheral Component Interconnect Express ('PCIe') expansion subsystem improved according to embodiments of the present invention. A PCIe expansion subsystem includes those subsystems implemented according to the set of Peripheral Component Interconnect Express ('PCIe') specifications promulgated by the PCI Special Interest Group ('PCI SIG'). Although the description of FIG. 1 explains embodiments of the present invention in terms of PCIe, readers will note that throttling a point-to-point, serial I/O expansion subsystem within a computing system according to the present invention may also be implemented using improvements to other point-to-point, serial I/O expansion subsystems implemented, for example, according to specifications for InfiniBand™, RapidIO™, HyperTransport™, and so on.

A PCIe expansion subsystem uses existing PCI programming and software concepts, but is based on a different and much faster serial physical-layer communications protocol. The physical-layer consists not of a bus, but of a network of serial interconnections extending to each PCIe adapter from a PCIe root complex (112) included in the computing system (110). The PCIe root complex (112) of FIG. 1 is a computer hardware chipset that handles communications between the components of a computer system such as, for example, a computer processor, RAM, non-volatile memory, power management components, the real-time system clock, PCIe adapters, and so on. The PCIe root complex includes a host bridge for communicating with one or more computer processors. The PCIe root complex also includes a number of ports that each provides data communication with a port on a PCIe device such as, for example, a PCIe switch or PCIe adapter.

A communication link is a data communication connection between an I/O adapter in a point-to-point, serial I/O expansion subsystem and the subsystem's switch that connects the I/O adapter with other components of the subsystem such as, for example, a processor or another I/O adapter. In the example of FIG. 1, the communication links are implemented as PCIe links (114, 116, 118, 120). Each PCIe link is a connection between a PCIe port on a PCIe adapter and a PCIe port on the PCIe root complex (112). Each link consists of a collection of one or more lanes used for data communications between PCIe devices. Each lane is a set of two unidirectional low voltage differential signaling pairs of transmission pathways such as, for example, traces along a motherboard. Because transmitting data and receiving data are implemented using separate differential pairs, each lane allows for dual-simplex serial data communication of up to five gigabits of data per second with the potential for increased bandwidth as technology in the physical layer advances. The ability to combine several lanes together to form a link allows PCIe technology to provide scalable bandwidth. Current PCIe specifications allow for links composed of one lane, two lanes, four lanes, eight lanes, sixteen lanes, and thirty-two lanes.

The exemplary computing device (152) of FIG. 1 includes computer processor (156) or 'CPU' as well as random access memory (168) ('RAM'). The RAM (168) is connected through a high speed memory bus (166) and the PCIe root complex (112) to processor (156) and to other components of the exemplary computing system. Stored in RAM (168) is an operating system (108). The operating system (108) of FIG. 1 is system software that performs basic tasks such as, for example, controlling and allocating virtual memory, prioritizing the processing of instructions, controlling virtualized input and output devices, facilitating networking, managing a virtualized file system, and so on. Operating systems useful in computers according to embodiments of the present invention include UNIX™, Linux™, Microsoft NT™, IBM's AIX™, IBM's i5/OS™, and others as will occur to those of skill in the art.

The exemplary computing device (152) also includes a baseboard management controller ('BMC') (104). The BMC (104) of FIG. 1 is a specialized microcontroller embedded on the motherboard of the computing device (152) that provides an interface for the platform hardware and low-level processing. The BMC (104) connects to the processor (156), environmental sensors (106), and the PCIe root complex (112) through an out-of-band network ('OOBN') (105). The OOBN (105) of FIG. 1 may be implemented as an I$^2$C bus, for example, a multi-master serial computer bus invented by Philips that is used to attach low-speed peripherals to a motherboard or an embedded system. I$^2$C is a simple, low-bandwidth, short-distance protocol that employs only two bidirectional open-drain lines, Serial Data (SDA) and Serial Clock (SCL), pulled up with resistors. Although the exemplary computer (152) may utilize the I$^2$C protocol, readers will note this is for explanation and not for limitation. In addition to the I$^2$C protocol, the OOBN (105) may be implemented using other technologies as will occur to those of ordinary skill in the art, including for example, technologies described in the Intelligent Platform Management Interface ('IPMI') specification, the System Management Bus ('SMBus') specification, the Joint Test Action Group ('JTAG') specification, and so on.

In the example of FIG. 1, the BMC (104) has installed upon it the link configuration module (102). The link configuration module (102) of FIG. 1 is a set of computer program instructions for throttling a point-to-point, serial I/O expansion subsystem within a computing system according to embodiments of the present invention. The link configuration module (102) operates generally for throttling a point-to-point, serial I/O expansion subsystem within a computing system according to embodiments of the present invention by: receiving an external environmental parameter value representing a condition of an environment external to the computing system; determining a link configuration of a communication link for an I/O adapter in a point-to-point, serial I/O expansion subsystem within the computing system in dependence upon the external environmental parameter value; and configuring the communication link for the I/O adapter in dependence upon the link configuration. Although the link configuration module (102) in FIG. 1 is stored and executed by the BMC (104), readers will note that in other embodiments, the link configuration module may also be stored in other non-volatile memory or RAM (168) and executed by the processor (156).

A link configuration for a communication link specifies the operating characteristics for that particular communications link. For example, a link configuration may specify the maximum clock frequency used to transmit data through a particular communication link. The clock frequency used to transmit data through a particular communication link is referred to as the 'link speed.' For further example, a link configuration may specify the maximum number of lanes used to transmit data through a particular communication link. The number of lanes used to transmit data through a particular communication link is referred to as the 'link width.'

The exemplary computing system (110) of FIG. 1 includes environmental sensors (106). The environmental sensors (106) of FIG. 1 are electronic components used to detect one or more environmental parameters that make up the condition of the environment external to the computing system (110). Environmental parameters describe the physical environment in which the computing system operates. Examples of environment parameters may include ambient temperature, acoustic level, altitude, humidity, and so on. In the example of FIG. 1, the environmental sensors (106) measure conditions of an environment external to the computing system (110) and provide the BMC (104) with external environmental parameter values representing various aspects of the condition of the environment external to the computing system (110).

The exemplary computing system (110) of FIG. 1 includes several I/O adapters implemented as PCIe adapters (111, 167, 172, 178), each adapter connected to the PCIe root complex (112) through a communications link. A PCIe adapter is an I/O adapter implemented according to the PCIe family of specifications. For example, the exemplary computer (110) of FIG. 1 includes PCIe disk drive adapter (172) coupled through the link (120) with the PCIe root complex (112) to processors (156) and other components of the exemplary computing device (152). Disk drive adapter (172) connects non-volatile data storage to the exemplary computer (110) in the form of disk drive (170). Other non-volatile data storage may be implemented for a computer as an optical disk drive, electrically erasable programmable read-only memory (so-called 'EEPROM' or 'Flash' memory), RAM drives, and so on, as will occur to those of skill in the art.

The exemplary computer (110) of FIG. 1 includes a PCIe input adapter (178) coupled through link (118) with the PCIe root complex (112) to processors (156) and other components of the exemplary computing device (152). The PCIe input adapter implements user-oriented input through, for example, software drivers and computer hardware for controlling user input from user input devices (181) such as keyboards and mice. The exemplary computing device (152) of FIG. 1 includes a PCIe video adapter (111), which is an example of an I/O adapter specially designed for graphic output to a display device (180) such as a display screen or computer monitor. The PCIe video adapter (111) is connected to processors (156) and other components of the exemplary computing device (152) through link (114) with the PCIe root complex (112).

The exemplary computing device (152) of FIG. 1 includes a PCIe communications adapter (167) coupled through link (116) with the PCIe root complex (112) to processors (156) and other components of the exemplary computing device (152). The PCIe communications adapter (167) provides data communications with other computers (182) and provides data communications through data communications network (200). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in the present invention include modems for wired dial-up communications, IEEE 802.3 Ethernet adapters for wired data communications network communications, and IEEE 802.11b adapters for wireless data communications network communications.

In the example of FIG. 1, readers will note that the computing system includes only a single computing device. Such an exemplary computing system, however, is for explanation only and not for limitation. A computing system implemented according to embodiments of the present invention may include any number of computing devices. For further explanation, FIG. 2 sets forth a block diagram illustrating a further exemplary computing system useful in throttling a point-to-point, serial I/O expansion subsystem within the computing system according to embodiments of the present invention.

Figure 2:
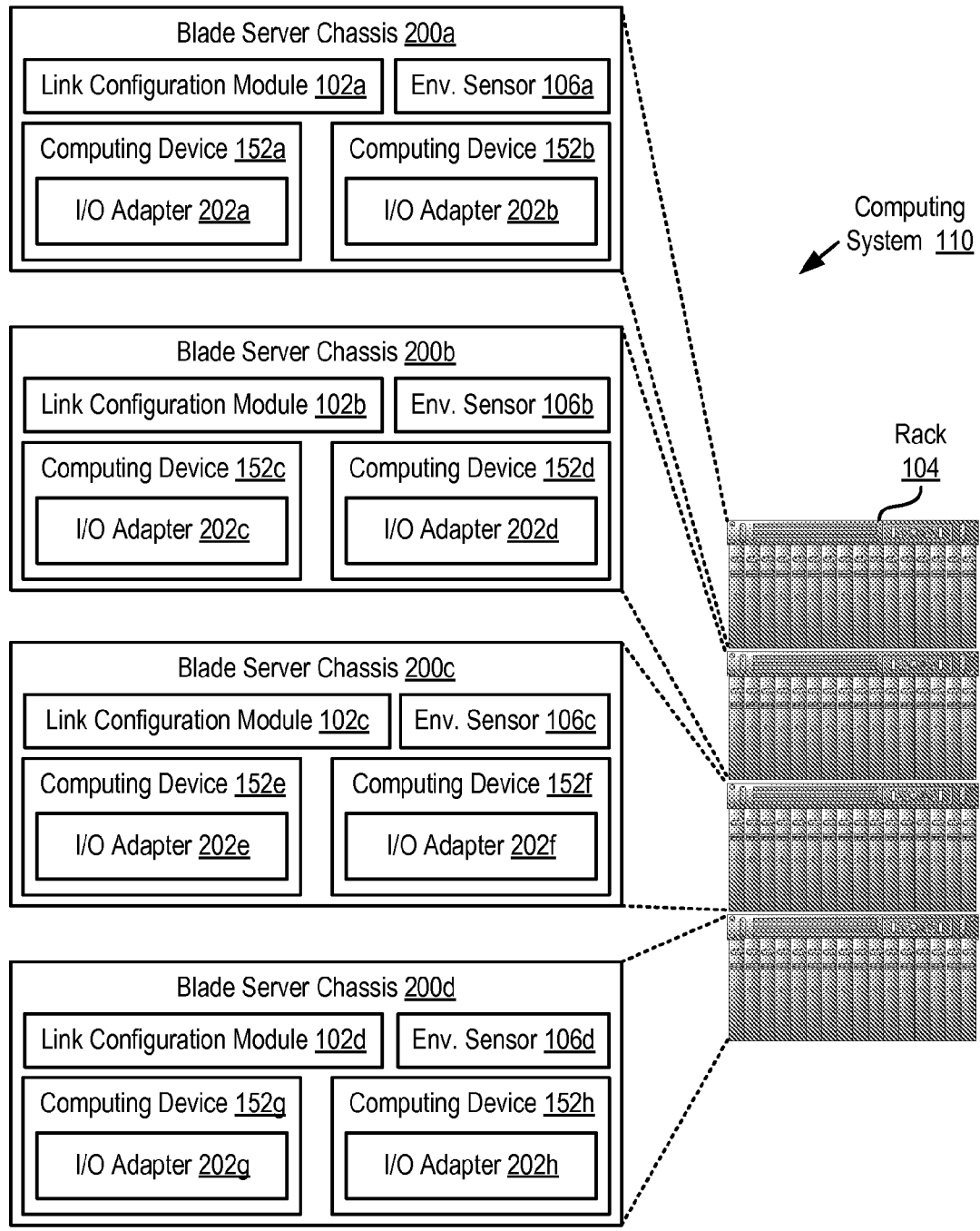
FIG. 2 sets forth a block diagram illustrating a further exemplary computing system useful in throttling a point-to-point, serial I/O expansion subsystem within the computing system according to embodiments of the present invention.

The exemplary computing system (110) of FIG. 2 includes a plurality of computing devices (152), each computing device (152) implemented as a blade server such as, for example, an IBM BladeCenter® blade server. In the example of FIG. 2, each computing device (152) includes an I/O adapter (202). The computing devices (152) of FIG. 2 are installed in four blade server chassis (200) such as, for example, an IBM BladeCenter® blade server chassis. The four blade server chassis (200) are, in turn, installed in a server rack (104).

In the example of FIG. 2, each blade server chassis (200) has installed upon it a link configuration module (102) for throttling the point-to-point, serial I/O expansion subsystems in that chassis (200). Each blade server chassis (200) may store the link configuration module (102) in non-volatile memory and execute the link configuration module (102) using a microcontroller in each chassis (200). The link configuration module (102) installed in the each chassis (200) operates to throttle point-to-point, serial I/O expansion subsystems according to embodiments of the present invention by: receiving an external environmental parameter value representing a condition of an environment external to the computing system (110); determining a link configuration of a communication link for an I/O adapter (202) in a point-to-point, serial I/O expansion subsystem within the computing system (110) in dependence upon the external environmental parameter value; and configuring the communication link for the I/O adapter (202) in dependence upon the link configuration. The link configuration module (102) in each chassis (200) may determine a link configuration of a communication link for an I/O adapter by determining, for each computing device (152) in that chassis (200), the link configuration of the communication link for the I/O adapter of that computing device (152) in dependence upon the external environmental parameter value. The link configuration module (102) in each chassis (200) may configure the communication link for each I/O adapter (202) in dependence upon the link configuration by configuring, for each computing device (152) in that chassis (200), the communication link of the I/O adapter of that computing device (152) in dependence upon the link configuration for the communication link of the I/O adapter of that computing device (152).

In the example of FIG. 2, each blade server chassis (200) includes its own environmental sensors (106) that provide external environmental parameter values to the link configuration module (102) installed on that particular blade server chassis. In such a manner, the environmental sensors (106) in each chassis (200) may provide external environmental parameter values to a link configuration module independently of the environmental sensors in the other chassis to reflect localized conditions of the environment external to the computing system (110). For example, the environmental sensors (106d) included in the blade server chassis (200d) installed in the bottom of the rack (104) may detect cooler temperatures than the environmental sensors (106a) included in the blade server chassis (200a) installed in the top of the rack (104). The link configuration modules (102a, 102d) may then configure the communication links in each chassis (200a, 200d) accordingly to reflect the differences in temperature between the chassis (200a, 200d).

In the example of FIG. 2, each link configuration module installed in each blade server chassis receives external environmental parameter values from a different set of environmental sensors. Readers will note, however, that in some other embodiments, each link configuration module installed in each blade server chassis may receive external environmental parameter values from the same set of environmental sensors. For further explanation, FIG. 3 sets forth a block diagram illustrating a further exemplary computing system useful in throttling a point-to-point, serial I/O expansion subsystem within the computing system according to embodiments of the present invention.

Figure 3:
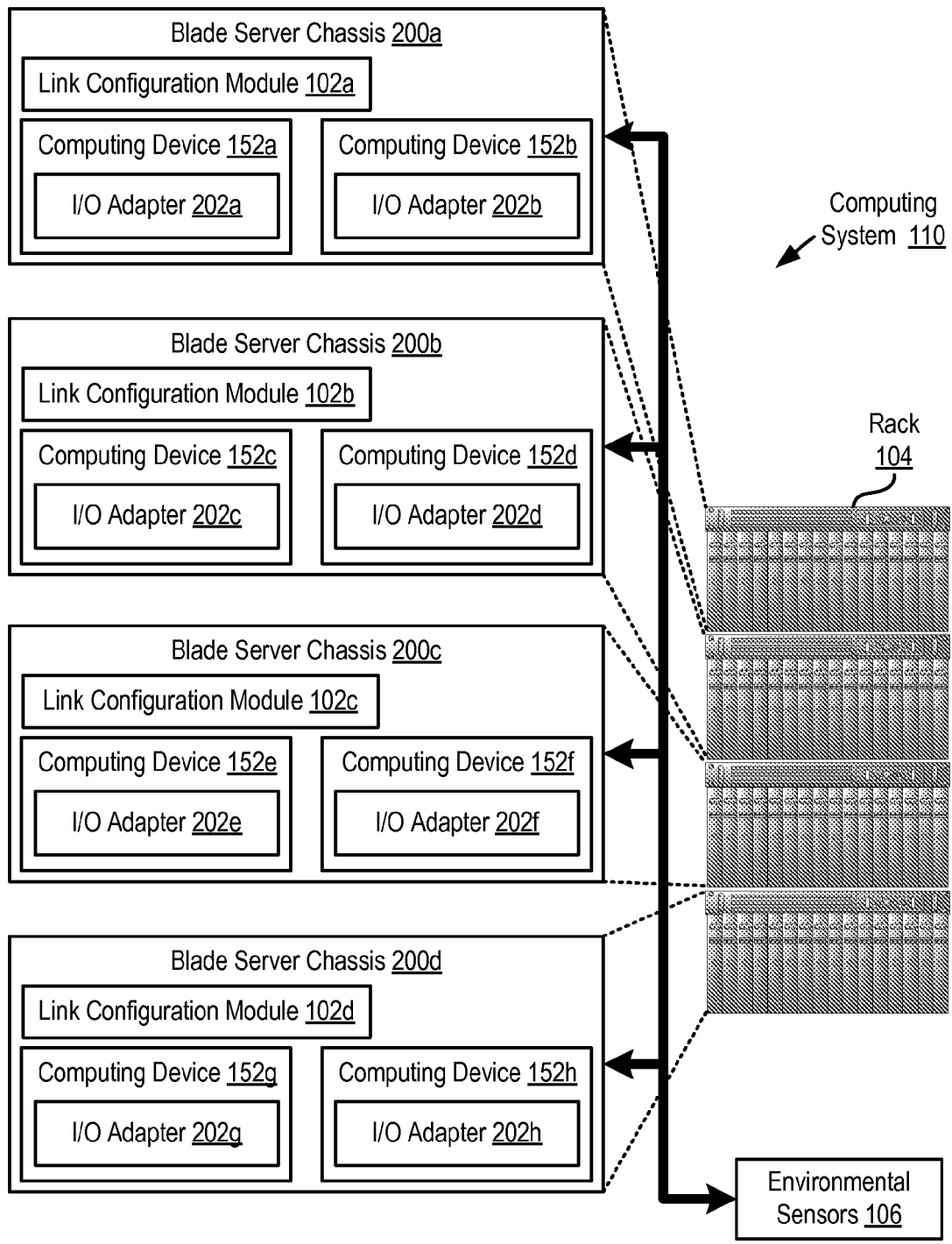
FIG. 3 sets forth a block diagram illustrating a further exemplary computing system useful in throttling a point-to-point, serial I/O expansion subsystem within the computing system according to embodiments of the present invention.

The exemplary computing system (110) of FIG. 3 includes a plurality of computing devices (152), each computing device (152) implemented as a blade server such as, for example, an IBM BladeCenter® blade server. In the example of FIG. 3, each computing device (152) includes an I/O adapter (202). The computing devices (152) are installed in four blade server chassis (200) such as, for example, an IBM BladeCenter® blade server chassis. The four blade server chassis (200) are, in turn, installed in a server rack (104).

In the example of FIG. 3, each blade server chassis (200) has installed upon it a link configuration module (102) for throttling the point-to-point, serial I/O expansion subsystems in that chassis (200). Each blade server chassis (200) may store the link configuration module (102) in non-volatile memory and execute the link configuration module (102) using a microcontroller in each chassis (200). The link configuration module (102) installed in the each chassis (200) operates to throttle point-to-point, serial I/O expansion subsystems according to embodiments of the present invention by: receiving an external environmental parameter value representing a condition of an environment external to the computing system (110); determining a link configuration of a communication link for an I/O adapter (202) in a point-to-point, serial I/O expansion subsystem within the computing system (110) in dependence upon the external environmental parameter value; and configuring the communication link for the I/O adapter (202) in dependence upon the link configuration. The link configuration module (102) in each chassis (200) may determine a link configuration of a communication link for an I/O adapter by determining, for each computing device (152) in that chassis (200), the link configuration of the communication link for the I/O adapter of that computing device (152) in dependence upon the external environmental parameter value. The link configuration module (102) in each chassis (200) may configure the communication link for each I/O adapter (202) in dependence upon the link configuration by configuring, for each computing device (152) in that chassis (200), the communication link of the I/O adapter of that computing device (152) in dependence upon the link configuration for the communication link of the I/O adapter of that computing device (152).

In the example of FIG. 3, the computing system (110) includes only a single set of environmental sensors (106). That single set of environmental sensors (106) provides external environmental parameter values to the link configuration module (102) installed on each blade server chassis (200). In such a manner, each link configuration module (102) receives the same external environmental parameter values. However, the link configuration module (102) in each chassis (202) may use those external environmental parameter values to determine link configurations for the communication link in that chassis (200) independently of the link configuration modules in the other chassis.

In FIGS. 2 and 3, each blade server chassis has installed upon it a link configuration module for throttling point-to-point, serial I/O expansion subsystems in that chassis. In some other embodiments, a single link configuration module may be utilized to throttle point-to-point, serial I/O expansion subsystems across multiple blade server chassis. For further explanation, FIG. 4 sets forth a block diagram illustrating a further exemplary computing system useful in throttling a point-to-point, serial I/O expansion subsystem within the computing system according to embodiments of the present invention.

Figure 4:
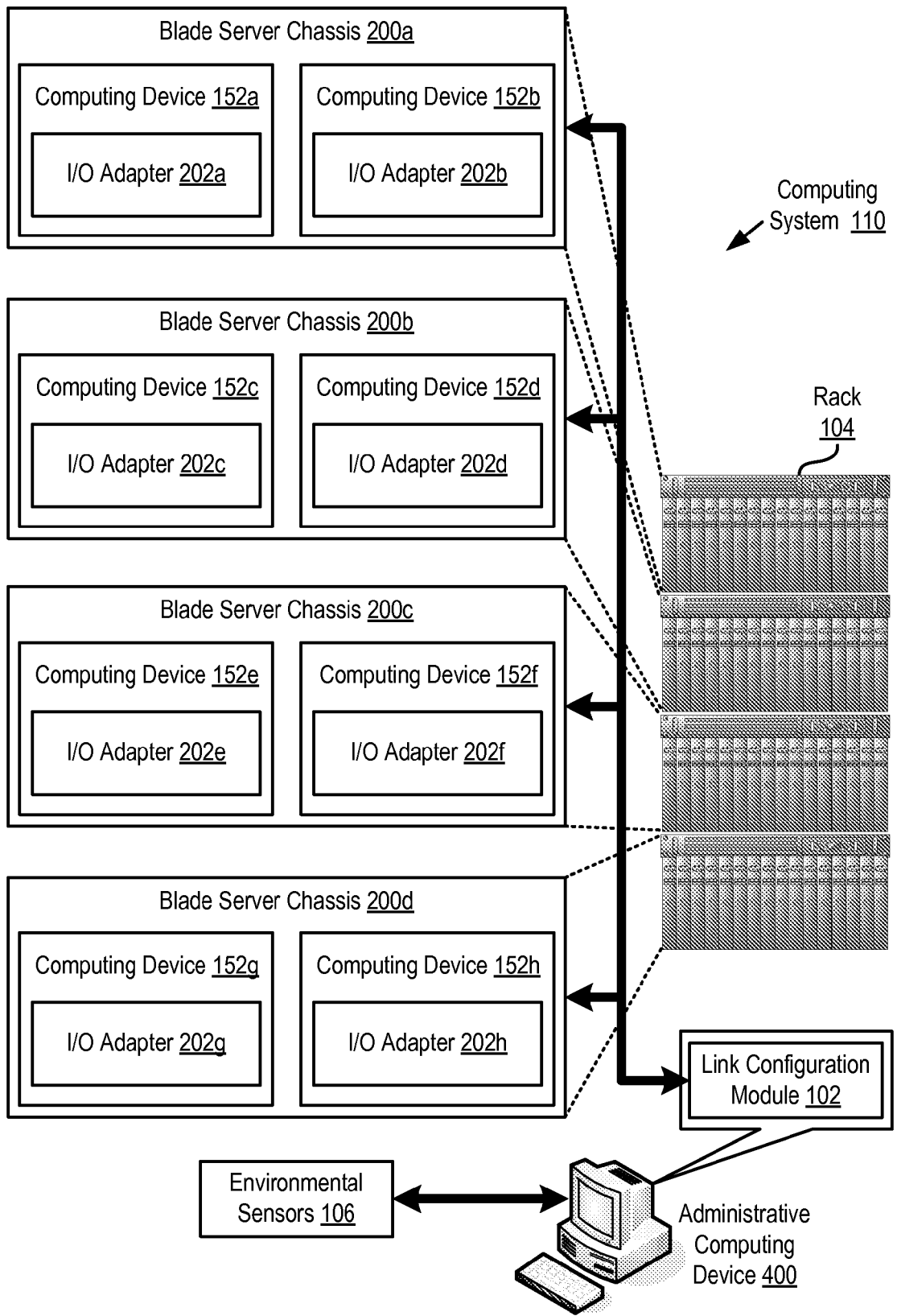
FIG. 4 sets forth a block diagram illustrating a further exemplary computing system useful in throttling a point-to-point, serial I/O expansion subsystem within the computing system according to embodiments of the present invention.

The exemplary computing system (110) of FIG. 4 includes a plurality of computing devices (152), each computing device (152) implemented as a blade server such as, for example, an IBM BladeCenter® blade servers. In the example of FIG. 4, each computing device (152) includes an I/O adapter (202). The computing devices (152) are installed in four blade server chassis (200) such as, for example, an IBM BladeCenter® blade server chassis. The four blade server chassis (200) are, in turn, installed in a server rack (104).

The exemplary computing system (110) of FIG. 4 also includes an administrative computing device (400). The administrative computing device (400) is computer hardware and software utilized to administer the point-to-point, serial I/O expansion subsystems in the computing system (110). The administrative computing device (400) of FIG. 4 has installed upon it a link configuration module (102). The link configuration module (102) operates to throttle point-to-point, serial I/O expansion subsystems according to embodiments of the present invention by: receiving an external environmental parameter value representing a condition of an environment external to the computing system (110); determining a link configuration of a communication link for an I/O adapter (202) in a point-to-point, serial I/O expansion subsystem within the computing system (110) in dependence upon the external environmental parameter value; and configuring the communication link for the I/O adapter (202) in dependence upon the link configuration.

The link configuration module (102) of FIG. 4 may receive an external environmental parameter value representing a condition of an environment external to the computing system (110) from a single set of environmental sensors (106). The link configuration module (102) may determine a link configuration of a communication link for an I/O adapter by determining, for each computing device (152), the link configuration of the communication link for the I/O adapter of that computing device (152) in dependence upon the external environmental parameter value. The link configuration module (102) may configure the communication link for each I/O adapter (202) in dependence upon the link configuration by configuring, for each computing device (152), the communication link of the I/O adapter of that computing device (152) in dependence upon the link configuration for the communication link of the I/O adapter of that computing device (152).

For further explanation, FIG. 5 sets forth a flow chart illustrating an exemplary method of throttling a point-to-point, serial I/O expansion subsystem within a computing system according to embodiments of the present invention. The method includes receiving (500), by a link configuration module, an external environmental parameter value representing a condition of an environment external to the computing system. The link configuration module may receive (500) an external environmental parameter value according to the method of FIG. 5 by polling an environmental sensor operatively coupled to the link configuration module. In other embodiments, the link configuration module may receive (500) an external environmental parameter value according to the method of FIG. 5 by receiving periodic updates from the environmental sensor that provide a current external environmental parameter value. Examples of external environmental parameter values that may be received by the link configuration module may include values that represent ambient temperature or acoustic levels.

The method of FIG. 5 also includes determining (502), by the link configuration module, a link configuration of a communication link for an I/O adapter in a point-to-point, serial I/O expansion subsystem within the computing system in dependence upon the external environmental parameter value. A link configuration for a communication link specifies the operating characteristics for that particular communications link. For example, a link configuration may specify the maximum clock frequency used to transmit data through a particular communication link. The clock frequency used to transmit data through a particular communication link is referred to as the 'link speed.' For further example, a link configuration may specify the maximum number of lanes used to transmit data through a particular communication link. The number of lanes used to transmit data through a particular communication link is referred to as the 'link width.' In such a manner, determining (502) a link configuration of a communication link for an I/O adapter in dependence upon external environmental parameter values allows a link configuration module to change a link's configuration such as the maximum link speed or link width based on changes in the external environment conditions such as temperature or acoustic level. In the example of FIG. 5, the link configuration module determines (502) a link configuration of a communication link for an I/O adapter by identifying (504) a link configuration profile for the I/O adapter and determining (506) the link configuration of the communication link for the I/O adapter in dependence upon the link configuration profile for the I/O adapter. A link configuration profile for an I/O adapter specifies acceptable configuration changes to the communication link for the I/O adapter based on the condition of the environment external to the computing system. The link configuration module may identify (504) a link configuration profile for the I/O adapter according to the method of FIG. 5 by retrieving an adapter identifier for the I/O adapter from non-volatile memory stored on the I/O adapter and retrieving the link configuration profile from a link configuration profile table having an adapter identifier that matches the identifier retrieved from the I/O adapter. For example, consider the following exemplary table of link configuration profiles:

TABLE 1

LINK CONFIGURATION PROFILE TABLE

| DEVICE IDENTIFIER | LINK CONFIGURATION | |
|---|---|---|
| | LINK SPEED | LINK WIDTH |
| Video_Adapter_ID | No | No |
| SCSI_Adapter_ID | No | Yes |
| IDE_Adapter_ID | Yes | Yes |
| Network_Adapter_ID | Yes | Yes |

Each record in the link configuration profile table above specifies a link configuration profile for an I/O adapter. The first record in the table above specifies that configuration changes to the link speed or the link width of the communication link for a video adapter in a computing system are not acceptable. The second record in the table above specifies that configuration changes to the link speed of the communication link for a Small Computer System Interface ('SCSI') adapter in a computing system are not acceptable, but configuration changes to the link width of the communication link for a Small Computer System Interface ('SCSI') adapter in a computing system are acceptable. The third record in the table above specifies that configuration changes to the link speed or the link width of the communication link for an Integrated Drive Electronics ('IDE') adapter in a computing system are acceptable. The fourth record in the table above specifies that configuration changes to the link speed or the link width of the communication link for a network adapter in a computing system are acceptable. In such a manner, the exemplary link configuration profiles above allow a link configuration module to throttle a point-to-point, serial I/O expansion subsystem using device-specific information.

Readers will note in embodiments in which the I/O adapters are distributed among multiple computing devices, each of the records in the table above may also include a field specifying an identifier for the computing device in which the I/O adapter is installed. Readers will further note that the exemplary link configuration profile table above storing exemplary link configuration profiles is for explanation only and not for limitation. Other link configuration profiles and data structures for storing those profiles as will occur to those of skill in the art may also be useful according to embodiments of the present invention.

The link configuration module may determine (506) the link configuration of the communication link for the I/O adapter in dependence upon the link configuration profile for the I/O adapter according to the method of FIG. 5 by adjusting the I/O adapter's current link configuration based on the link configuration profile for the I/O adapter and the received external environmental parameter value. For example, consider a communication link with a network adapter having a link configuration profile that specifies that changes the link's width is acceptable to accommodate changes in the condition of the external environment. Further consider that the link configuration module receives an external environmental parameter value indicating that the ambient temperature has risen by five degrees Celsius. The link configuration module may adjust the network adapter's current link configuration by reducing the link width for the link in an effort to lower the amount of thermal energy generated by the computing system. If the ambient temperature continues to rise, the link configuration module may adjust the network adapter's link configuration by further reducing the link width in an effort to lower still further the amount of thermal energy generated by the computing system.

Determining (502) a link configuration of a communication link for an I/O adapter according to the method of FIG. 5 by identifying (504) a link configuration profile for the I/O adapter and determining (506) the link configuration of the communication link for the I/O adapter in dependence upon the link configuration profile for the I/O adapter allows throttling of point-to-point, serial I/O expansion subsystem within a computing system using device-specific information. Readers will note, however, that in other embodiments the link configuration module may determine a link configuration of a communication link for an I/O adapter by adjusting the I/O adapter's current link configuration based on the received external environmental parameter values without any device-specific information such as an adapter's link configuration profile.

The method of FIG. 5 also includes configuring (508), by the link configuration module, the communication link for the I/O adapter in dependence upon the link configuration. A link configuration module configures (508) the communication link for the I/O adapter according to the method of FIG. 5 by changing (510) a link speed of the communication link for the I/O adapter. The link configuration module may change (510) the link speed of the communication link for the I/O adapter according to the method of FIG. 5 by setting the link's new link speed in a configuration register for the communication link and re-establishing the link at the new link speed. For example, when the point-to-point, serial I/O expansion subsystem is implemented as a PCIe expansion subsystem, the link configuration module may write the link's new speed in the Target Link Speed field of Link Control 2 register of the PCIe port in the root complex for that communication link with the I/O adapter and then instruct the root complex to retrain the link.

A link configuration module also configures (508) the communication link for the I/O adapter according to the method of FIG. 5 by changing (512) a link width of the communication link for the I/O adapter. The link configuration module may change (512) the link width of the communication link for the I/O adapter according to the method of FIG. 5 by setting the link's new link width in a configuration register for the communication link and re-establishing the link with the new link width. For example, when the point-to-point, serial I/O expansion subsystem is implemented as a PCIe expansion subsystem, the link configuration module may write the link's new width in the register of the PCIe port in the root complex for that communication link with the I/O adapter and instruct the root complex to retrain the link.

Exemplary embodiments of the present invention are described largely in the context of a fully functional computer system for throttling a point-to-point, serial I/O expansion subsystem within a computing system. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of throttling a point-to-point, serial I/O expansion subsystem within a computing system, the method comprising:
    receiving, by a link configuration module, an external environmental parameter value representing a condition of an environment external to the computing system, wherein the external environmental parameter is measured by an environmental sensor that is external to a chassis of the computing system;
    determining, by the link configuration module, a link configuration of a communication link for an I/O adapter in a point-to-point, serial I/O expansion subsystem within the computing system in dependence upon the external environmental parameter value; and
    configuring, by the link configuration module, the communication link for the I/O adapter in dependence upon the link configuration.

2. The method of claim 1 wherein determining, by the link configuration module, a link configuration of a communication link for an I/O adapter in dependence upon the external environmental parameter value further comprises:
    identifying a link configuration profile for the I/O adapter, the link configuration profile specifying acceptable configuration changes to the communication link for the I/O adapter based on the condition of the environment external to the computing system; and
    determining the link configuration of the communication link for the I/O adapter in dependence upon the link configuration profile for the I/O adapter.

3. The method of claim 1 wherein configuring, by the link configuration module, the communication link for the I/O adapter in dependence upon the link configuration further comprises changing a link speed of the communication link for the I/O adapter.

4. The method of claim 1 wherein configuring, by the link configuration module, the communication link for the I/O adapter in dependence upon the link configuration further comprises changing a link width of the communication link for the I/O adapter.

5. The method of claim 1 wherein:
    the computing system includes a plurality of computing devices, each of the computing devices having an I/O adapter;
    determining, by the link configuration module, a link configuration of a communication link for an I/O adapter in dependence upon the external environmental parameter value further comprises determining, for each computing device, the link configuration of the communication link for the I/O adapter of that computing device in dependence upon the external environmental parameter value; and
    configuring, by the link configuration module, the communication link for the I/O adapter in dependence upon the link configuration further comprises configuring, for each computing device, the communication link of the I/O adapter of that computing device in dependence upon the link configuration for the communication link of the I/O adapter of that computing device.

6. The method of claim 1 wherein:
    the point-to-point, serial I/O expansion subsystem is a Peripheral Component Interconnect Express ('PCIe') expansion subsystem;
    the communication link is a PCIe link; and
    the I/O adapter is a PCIe adapter.

7. A computing system for throttling a point-to-point, serial I/O expansion subsystem within the computing system, the computing system comprising a computer processor and a computer memory operatively coupled to the computer processor, the computer memory having disposed within it a link configuration module, the link configuration module including computer program instructions capable of:
    receiving an external environmental parameter value representing a condition of an environment external to the computing system, wherein the external environmental parameter is measured by an environmental sensor that is external to a chassis of the computing system;
    determining a link configuration of a communication link for an I/O adapter in a point-to-point, serial I/O expansion subsystem within the computing system in dependence upon the external environmental parameter value; and
    configuring the communication link for the I/O adapter in dependence upon the link configuration.

8. The computing system of claim 7 wherein determining a link configuration of a communication link for an I/O adapter in dependence upon the external environmental parameter value further comprises:
    identifying a link configuration profile for the I/O adapter, the link configuration profile specifying acceptable configuration changes to the communication link for the I/O adapter based on the condition of the environment external to the computing system; and
    determining the link configuration of the communication link for the I/O adapter in dependence upon the link configuration profile for the I/O adapter.

9. The computing system of claim 7 wherein configuring the communication link for the I/O adapter in dependence upon the link configuration further comprises changing a link speed of the communication link for the I/O adapter.

10. The computing system of claim 7 wherein configuring the communication link for the I/O adapter in dependence upon the link configuration further comprises changing a link width of the communication link for the I/O adapter.

11. The computing system of claim 7 wherein:
the computing system includes a plurality of computing devices, each of the computing devices having an I/O adapter;
determining a link configuration of a communication link for an I/O adapter in dependence upon the external environmental parameter value further comprises determining, for each computing device, the link configuration of the communication link for the I/O adapter of that computing device in dependence upon the external environmental parameter value; and
configuring the communication link for the I/O adapter in dependence upon the link configuration further comprises configuring, for each computing device, the communication link of the I/O adapter of that computing device in dependence upon the link configuration for the communication link of the I/O adapter of that computing device.

12. The computing system of claim 7 wherein:
the point-to-point, serial I/O expansion subsystem is a Peripheral Component Interconnect Express ('PCIe') expansion subsystem;
the communication link is a PCIe link; and
the I/O adapter is a PCIe adapter.

13. A computer program product for throttling a point-to-point, serial I/O expansion subsystem within a computing system, the computer program product disposed upon a computer readable recordable medium, the computer program product comprising computer program instructions capable of:
receiving, by a link configuration module, an external environmental parameter value representing a condition of an environment external to the computing system, wherein the external environmental parameter is measured by an environmental sensor that is external to a chassis of the computing system;
determining, by the link configuration module, a link configuration of a communication link for an I/O adapter in a point-to-point, serial I/O expansion subsystem within the computing system in dependence upon the external environmental parameter value; and
configuring, by the link configuration module, the communication link for the I/O adapter in dependence upon the link configuration.

14. The computer program product of claim 13 wherein determining, by the link configuration module, a link configuration of a communication link for an I/O adapter in dependence upon the external environmental parameter value further comprises:
identifying a link configuration profile for the I/O adapter, the link configuration profile specifying acceptable configuration changes to the communication link for the I/O adapter based on the condition of the environment external to the computing system; and
determining the link configuration of the communication link for the I/O adapter in dependence upon the link configuration profile for the I/O adapter.

15. The computer program product of claim 13 wherein configuring, by the link configuration module, the communication link for the I/O adapter in dependence upon the link configuration further comprises changing a link speed of the communication link for the I/O adapter.

16. The computer program product of claim 13 wherein configuring, by the link configuration module, the communication link for the I/O adapter in dependence upon the link configuration further comprises changing a link width of the communication link for the I/O adapter.

17. The computer program product of claim 13 wherein:
the computing system includes a plurality of computing devices, each of the computing devices having an I/O adapter;
determining, by the link configuration module, a link configuration of a communication link for an I/O adapter in dependence upon the external environmental parameter value further comprises determining, for each computing device, the link configuration of the communication link for the I/O adapter of that computing device in dependence upon the external environmental parameter value; and
configuring, by the link configuration module, the communication link for the I/O adapter in dependence upon the link configuration further comprises configuring, for each computing device, the communication link of the I/O adapter of that computing device in dependence upon the link configuration for the communication link of the I/O adapter of that computing device.

18. The computer program product of claim 13 wherein:
the point-to-point, serial I/O expansion subsystem is a Peripheral Component Interconnect Express ('PCIe') expansion subsystem;
the communication link is a PCIe link; and
the I/O adapter is a PCIe adapter.

* * * * *